US012633794B2

(12) United States Patent
Ueda et al.

(10) Patent No.: US 12,633,794 B2
(45) Date of Patent: May 19, 2026

(54) ELECTRIC COMPRESSOR

(71) Applicant: MITSUBISHI HEAVY INDUSTRIES THERMAL SYSTEMS, LTD., Tokyo (JP)

(72) Inventors: Kosuke Ueda, Tokyo (JP); Ichiro Yogo, Tokyo (JP); Akinori Yoshioka, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 198 days.

(21) Appl. No.: 18/286,279

(22) PCT Filed: Apr. 13, 2022

(86) PCT No.: PCT/JP2022/017686
§ 371 (c)(1),
(2) Date: Oct. 10, 2023

(87) PCT Pub. No.: WO2022/220259
PCT Pub. Date: Oct. 20, 2022

(65) Prior Publication Data
US 2025/0079923 A1 Mar. 6, 2025

(30) Foreign Application Priority Data
Apr. 13, 2021 (JP) ................................. 2021-067797

(51) Int. Cl.
*H02K 3/44* (2006.01)
*H02K 3/52* (2006.01)
*F25B 31/02* (2006.01)
(52) U.S. Cl.
CPC .............. *H02K 3/44* (2013.01); *H02K 3/522* (2013.01); *F25B 31/026* (2013.01); *H02K 2203/09* (2013.01)

(58) Field of Classification Search
CPC .. H02K 3/44; H02K 3/46; H02K 3/50; H02K 3/52; H02K 3/522; H02K 2203/09;
(Continued)

(56) References Cited

U.S. PATENT DOCUMENTS 8,138,643 B2 3/2012 Fukasaku et al.
2003/0184167 A1 10/2003 Ioi
(Continued)

FOREIGN PATENT DOCUMENTS

CN 209516759 U 10/2019
JP 8-163804 A 6/1996
(Continued)

OTHER PUBLICATIONS

Extended European Search Report for European Application No. 22788182.8, dated Jul. 22, 2024.
(Continued)

*Primary Examiner* — Alexander A Singh
(74) *Attorney, Agent, or Firm* — Birch, Stewart, Kolasch & Birch, LLP

(57) ABSTRACT

Provided is an electric compressor which comprises a housing, a compressor for compressing a refrigerant including lubricating oil, and a motor which rotationally drives the compressor, wherein: the motor comprises a stator, a rotor, a plurality of lead wires connected to a plurality of coil portions, and protecting tubes which are arranged in such a way as to surround the entire circumference of the lead wires, and which protect the lead wires from moisture contained in the lubricating oil; the lead wires are coated with a resin coating portion and are arranged in a circumferential direction around an axis; and the protecting tubes are arranged only in a protection area in a portion of the
(Continued)

circumferential direction including an area in which the lead wires are immersed in the lubricating oil stored in an internal space of the housing.

4 Claims, 5 Drawing Sheets

(58) Field of Classification Search
CPC ........ F04B 39/00; F04B 35/04; F04B 39/121; F04C 23/008; F04C 18/0207; F04C 2240/40; F04C 2240/803; F25B 31/026
USPC ........................................................ 310/71
See application file for complete search history.

(56) References Cited

U.S. PATENT DOCUMENTS

| | | | | |
|---|---|---|---|---|
| 2011/0058973 A1* | 3/2011 | Yamada | ................... | H02K 5/12 |
| | | | | 418/55.1 |
| 2013/0064697 A1* | 3/2013 | Fukasaku | ................. | H02K 3/44 |
| | | | | 417/410.1 |

FOREIGN PATENT DOCUMENTS

| | | | |
|---|---|---|---|
| JP | 2003-293951 | A | 10/2003 |
| JP | 2006-77578 | A | 3/2006 |
| JP | 2013-60822 | A | 4/2013 |
| JP | 2013-146157 | A | 7/2013 |
| JP | 2015-183668 | A | 10/2015 |
| JP | 2020-51328 | A | 4/2020 |

OTHER PUBLICATIONS

International Search Report for International Application No. PCT/JP2022/017686, dated Jul. 12, 2022, with English translation.
Written Opinion of the International Searching Authority for International Application No. PCT/JP2022/017686, dated Jul. 12, 2022, with English translation.
Japanese Office Action for Japanese Application No. 2021-067797, dated Jun. 24, 2025, with English translation.

* cited by examiner

ELECTRIC COMPRESSOR

TECHNICAL FIELD

The present disclosure relates to an electric compressor.

BACKGROUND ART

In the related art, in a so-called hermetic motor used in an electric compressor or the like, electric power is supplied from the outside to a coil portion in which a coil is wound around a stator. The electric power from the outside is supplied to the coil portion by connecting the coil portion to a sealing terminal installed through a motor accommodation casing by a lead wire.

PTL 1 points out a problem that a part of the lead wire is in a free state between a stator end portion and the motor accommodation casing, and the free portion comes into contact with a rotor or the like to damage a covering portion of the lead wire and cause a short circuit. In PTL 1, a bobbin around which the coil is wound is provided with a guide portion that restricts movement of the lead wire to a rotor side, thereby preventing the lead wire from coming into contact with the rotor or the like.

CITATION LIST

Patent Literature

[PTL 1] Japanese Unexamined Patent Application Publication No. 2013-146157

SUMMARY OF INVENTION

Technical Problem

A refrigerant compressed by a compression mechanism built in an electric compressor contains a lubricant used inside the electric compressor. In a case where the lubricant stored in a motor accommodation casing contains moisture, a covering portion made of a resin of a lead wire immersed in the lubricant may be damaged by hydrolysis and a short circuit may occur.

The present disclosure has been made in view of such circumstances, and an object thereof is to provide an electric compressor capable of preventing damage to a covering portion made of a resin of an electrical lead connected to a coil portion and appropriately ensuring an insulation distance between the electrical lead and another member.

Solution to Problem

An electric compressor according to one aspect of the present disclosure includes: a housing formed in a tubular shape extending along an axis; a compressor that is disposed inside the housing and rotates around the axis to compress a refrigerant including a lubricant; and a motor that rotationally drives the compressor around the axis, in which the motor includes a stator that is fixed inside the housing and has a plurality of teeth around which coils are wound, a rotor disposed on an inner peripheral side of the stator, a plurality of coil portions formed by winding the coils around the plurality of teeth, a plurality of electrical leads connected to one end side of the plurality of coil portions in a direction along the axis, and a protective member that is disposed to surround an entire circumference of the electrical lead and protects the electrical lead from moisture contained in the lubricant, the electrical lead is covered with a covering portion made of a resin and is disposed along a circumferential direction around the axis, and the protective member is disposed only in a protection area in a portion of the circumferential direction including an area where the electrical lead is immersed in the lubricant stored in an internal space of the housing.

Advantageous Effects of Invention

According to the present disclosure, there is provided an electric compressor capable of preventing damage to a covering portion made of a resin of an electrical lead connected to a coil portion and appropriately ensuring an insulation distance between the electrical lead and another member.

DESCRIPTION OF EMBODIMENTS

Figure 1:
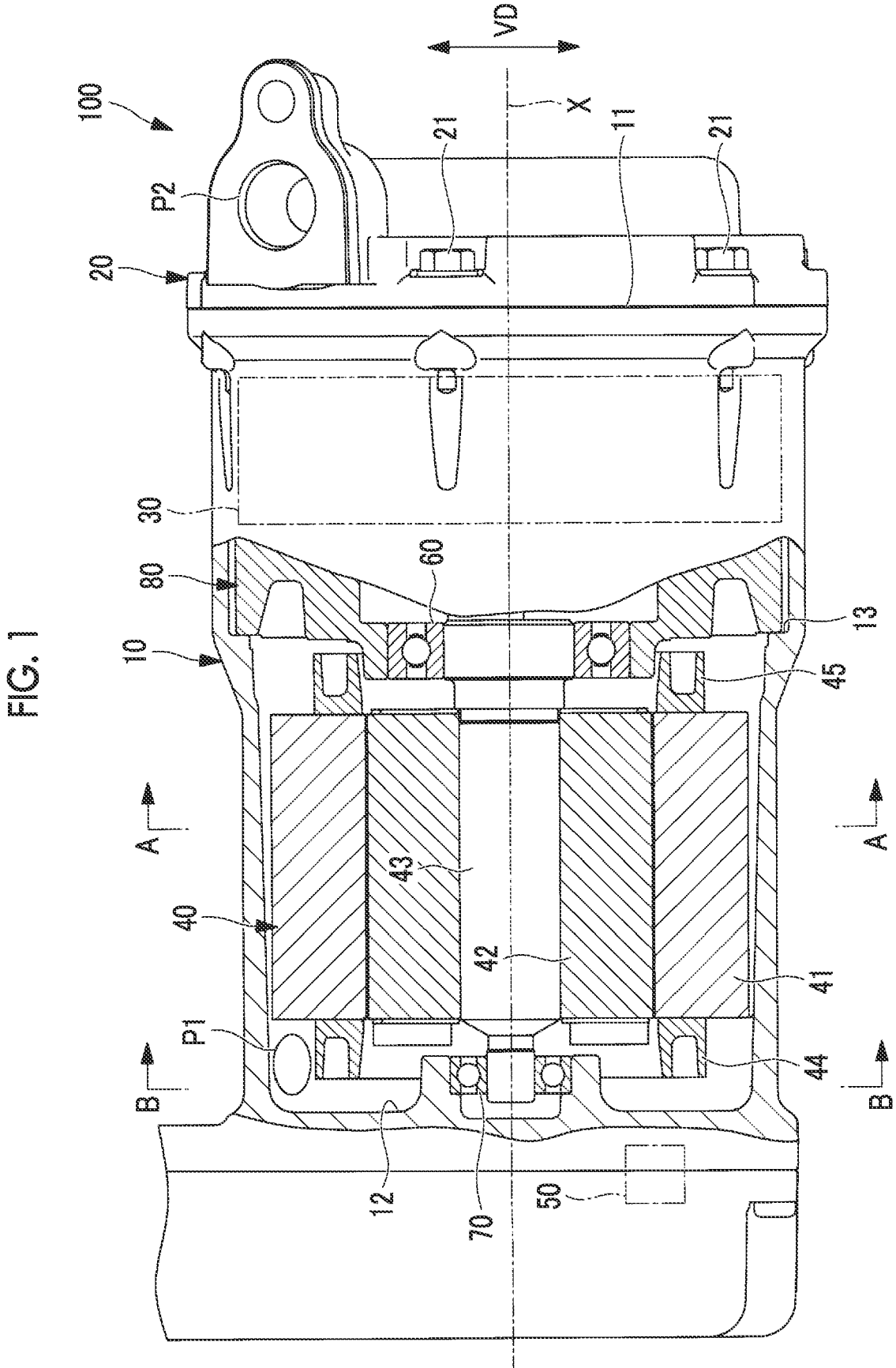
FIG. 1 is a partial longitudinal cross-sectional view of an electric compressor according to an embodiment of the present disclosure.
Figure 2:
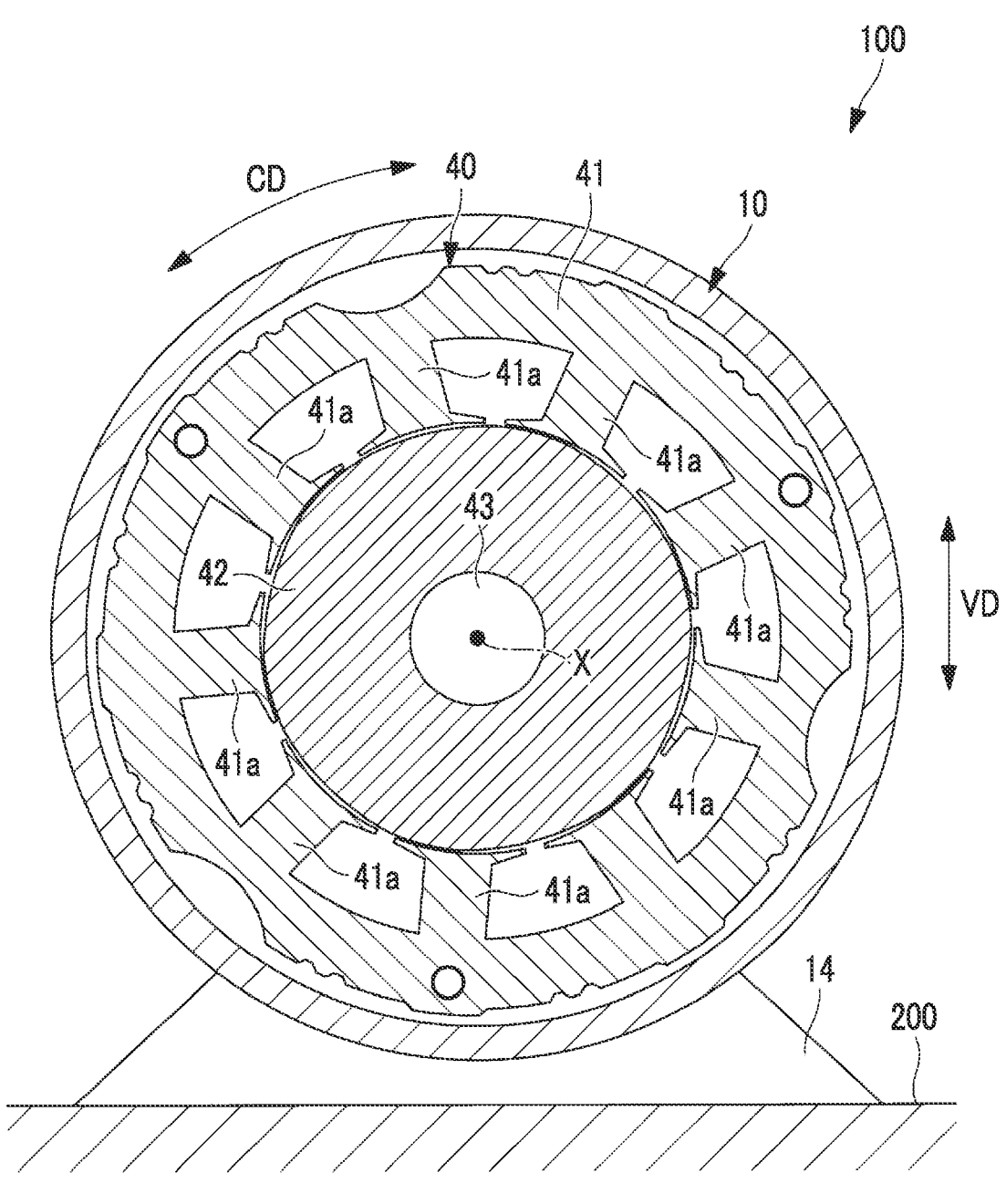
FIG. 2 is a cross-sectional view taken along the line A-A of the electric compressor shown in FIG. 1.
Figures 3, 4:
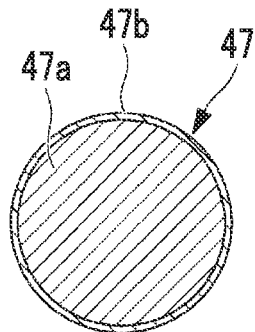
FIG. 3 is a cross-sectional view taken along the line B-B of the electric compressor shown in FIG. 1.
FIG. 4 is a cross-sectional view showing a lead wire.
Figure 5:
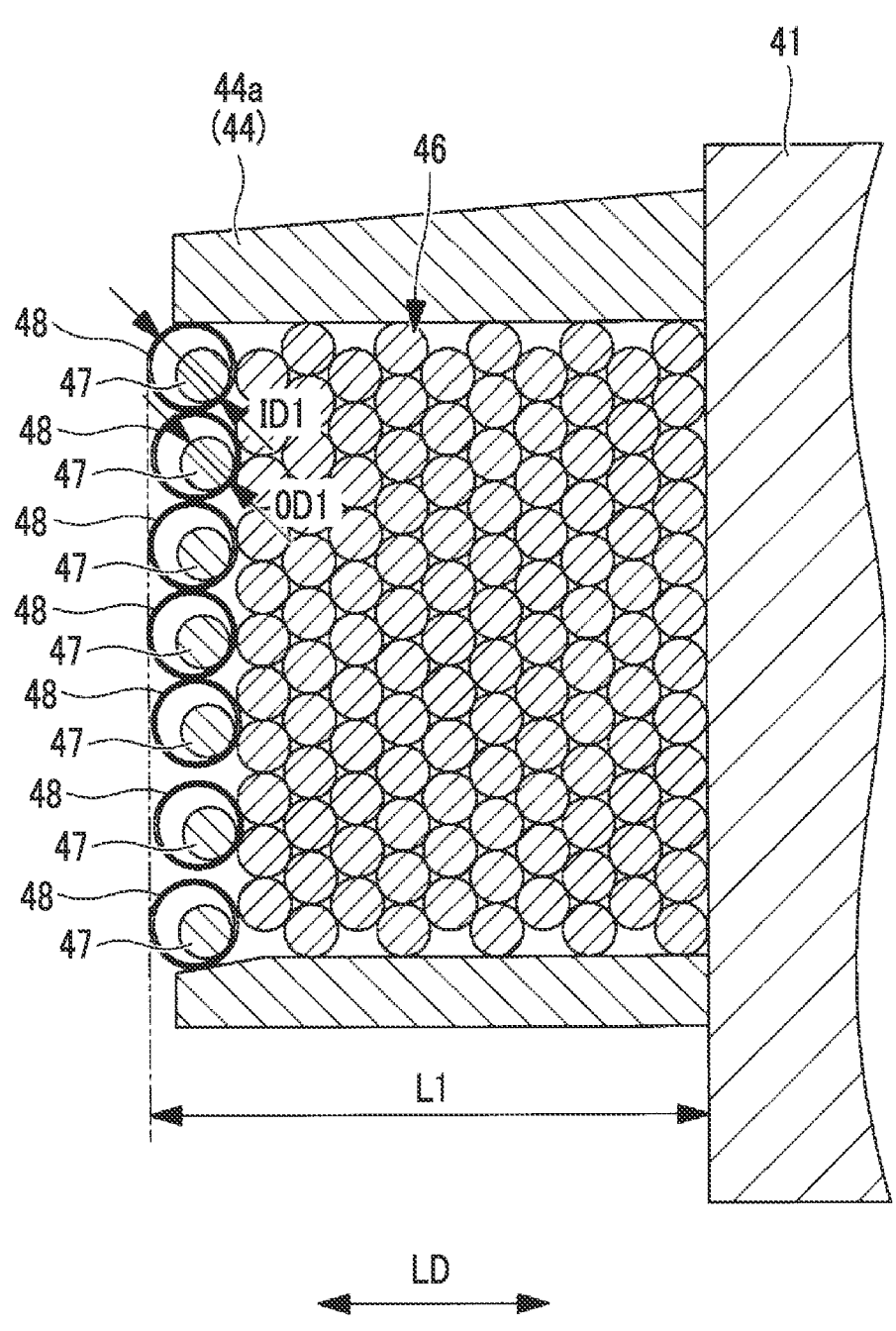
FIG. 5 is a cross-sectional view taken along the line C-C of the electric compressor shown in FIG. 3.

Hereinafter, an electric compressor 100 according to an embodiment of the present disclosure will be described with reference to the drawings. FIG. 1 is a partial longitudinal cross-sectional view showing the electric compressor according to the present embodiment. FIG. 2 is a cross-sectional view taken along the line A-A of the electric compressor 100 shown in FIG. 1. FIG. 3 is a cross-sectional view taken along the line B-B of the electric compressor 100 shown in FIG. 1. FIG. 4 is a cross-sectional view taken along the line C-C of the electric compressor 100 shown in FIG. 3. FIG. 5 is a cross-sectional view taken along the line D-D of the electric compressor 100 shown in FIG. 3. In FIG. 3, a rotor 42 and a drive shaft 43 shown in FIG. 2 are not illustrated.

The electric compressor 100 of the present embodiment is a device that compresses a refrigerant (fluid) sucked from a suction port P1 and discharges the refrigerant to the outside from a discharge port P2. As shown in FIG. 1, the electric compressor 100 of the present embodiment includes a housing 10, an end housing (sealing member) 20, a compressor 30, a motor 40, a sealing terminal 50, a first bearing 60, a second bearing 70, and a holding portion 80.

The housing 10 is a member formed in a substantially cylindrical shape extending along an axis X and accommodates the compressor 30 and the motor 40 therein. The housing 10 is formed of a metallic material such as an aluminum alloy. The housing 10 has an opening 11 sealed by the end housing 20 at an end portion on the end housing 20 side in a direction of the axis X. As shown in FIGS. 2 and 3, the housing 10 is fixed to a casing 200 via a leg portions 14 in a state in which the axis X is arranged in a horizontal direction.

As shown in FIG. 1, the suction port P1 is provided on an outer peripheral surface in the vicinity of a bottom portion 12 of the housing 10 on an upper side in a vertical direction (gravity direction) VD. The refrigerant supplied from the outside is introduced into the housing 10 from the suction port P1. The refrigerant introduced into the housing 10 flows along the axis X from the bottom portion 12 toward the opening 11.

The end housing 20 is a member that seals the opening 11 of the housing 10 in a state in which the compressor 30 and the motor 40 are inserted into the housing 10 from the opening 11. The end housing 20 is fixed to the housing 10 by fastening a fastening bolt 21 to a fastening hole (not shown) formed in the opening 11 of the housing 10. The opening 11 disposed at the end portion of the housing 10 on the compressor 30 side along the axis X is sealed by the end housing 20.

The compressor 30 is a device that is disposed inside the housing 10 and that rotates around the axis X to compress the refrigerant. The compressor 30 includes, for example, a scroll compression mechanism that compresses the refrigerant by causing an orbiting scroll (not shown) combined with a fixed scroll (not shown) fixed to the housing 10 to revolve around the axis X. The refrigerant compressed by the compressor 30 includes a lubricant for lubricating the compressor 30.

The compressor 30 sucks and compresses the refrigerant introduced into the housing 10 from the suction port P1 and guides the compressed refrigerant to the discharge port P2 provided in the end housing 20. The refrigerant guided to the discharge port P2 is supplied to the outside through a pipe (not shown) connected to the discharge port P2.

The motor 40 is a device that rotationally drives the compressor 30 around the axis X. The motor 40 includes a stator 41, the rotor 42, the drive shaft 43, a bobbin 44, a bobbin 45, a plurality of coil portions 46, a plurality of lead wires (electrical leads) 47, and a plurality of protective tubes 48.

The stator 41 is fixed inside the housing 10 and is configured by laying up a predetermined number of electromagnetic steel sheets which are punched in an annular shape. As shown in FIG. 2, a plurality of teeth 41a are provided on an inner peripheral side of the stator 41. In the stator 41, a coil (not shown) is wound around each of the plurality of teeth 41a.

The rotor 42 is disposed in a state in which a predetermined gap is provided on the inner peripheral side of the stator 41. The rotor 42 is configured by laying up a predetermined number of electromagnetic steel sheets which are punched in an annular shape.

The drive shaft 43 is a member that is connected to the rotor 42 by being inserted into a through-hole formed at a center of the rotor 42 and is disposed on the axis X. The drive shaft 43 is integrated with the rotor 42 to rotate around the axis X and transmits a driving force rotating around the axis X to the compressor 30. An end portion of the drive shaft 43 on the opening 11 side is supported to be rotatable around the axis X by the first bearing 60. An end portion of the drive shaft 43 on the bottom portion 12 side is supported to be rotatable around the axis X by the second bearing 70.

The bobbin 44 is a member that supports the coil wound around the teeth 41a of the stator 41 on the bottom portion 12 side in a direction along the axis X. Similarly, the bobbin 45 is a member that supports the coil wound around the teeth 41a of the stator 41 on the opening 11 side in the direction along the axis X. The bobbin 44 and the bobbin 45 are formed of a resin material.

As shown in FIG. 3, the bobbin 44 disposed on the bottom portion 12 side in the direction along the axis X has a plurality of support portions 44a for supporting the coil wound around the teeth 41a. The number of the support portions 44a is the same as that of the teeth 41a (nine in FIG. 3). Further, the bobbin 44 is provided with a fixing portion 44b for winding and fixing a lead wire 47 connected to the coil wound around each bobbin 44.

The coil portion 46 is a portion formed by winding coils around a plurality of the teeth 41a of the stator 41. As shown in FIG. 3, an end portion of the coil portion 46 on the bottom portion 12 side in the direction along the axis X is supported by the bobbin 44.

The lead wire 47 is an electrical lead connected to an end portion of each of the plurality of coil portions 46 on the bottom portion 12 side in the direction along the axis X. The lead wire 47 electrically connects the coil portion 46 and the sealing terminal 50. One end of the lead wire 47 is wound around each of a plurality of the fixing portions 44b and is disposed so as to extend clockwise along a circumferential direction CD shown in FIG. 3. The plurality of lead wires 47 are connected to the sealing terminal 50 in a state where cable covers CA1, CA2, and CA3 each cover multiple lead wires.

FIG. 4 is a cross-sectional view showing the lead wire 47. As shown in FIG. 4, the lead wire 47 has a core wire 47a and a covering portion 47b. The core wire 47a is formed of copper and is covered with the covering portion 47b made of a resin (for example, polyesterimide or polyamideimide).

The protective tube 48 is a member that is disposed so as to surround an entire circumference of the lead wire 47 and that protects the lead wire 47 from moisture contained in the lubricant. The protective tube 48 is a tube-shaped member and is formed of a resin material (for example, polyester). The protective tube 48 is thicker than the covering portion 47b of the lead wire 47.

The lubricant (not shown) contained in the refrigerant is stored on a lower side of an internal space IS of the housing 10 in the vertical direction (gravity direction) VD shown in FIG. 3. Since the refrigerant flows through the internal space IS, the lubricant does not have a liquid level of a constant height, but is accumulated on the lower side of the internal space IS in the vertical direction (gravity direction) VD. As shown in FIG. 3, the lubricant is mainly stored in an area of the housing 10 from a position of the lowermost end in the vertical direction VD to a height H1. This area is an area where the lead wire 47 is immersed in the lubricant.

As shown in FIG. 3, the protective tube 48 is disposed only in a protection area PA in a portion of the circumferential direction including the area where the lead wire 47 is immersed in the lubricant stored in the internal space IS of the housing 10 (an area equal to or lower than the height H1). The protection area PA is an area below the axis X of the housing 10 in the gravity direction and is an area in a range of an angle θ along the circumferential direction CD around the axis X. In addition, the protective tube 48 is disposed on the lead wire 47 connected to an end portion of the coil portion 46 on a side close to the suction port P1 (an end portion on the bobbin 44 side) out of a pair of end portions of the coil portion 46 (the end portion on the bobbin 44 side and an end portion on the bobbin 45 side) in the direction along the axis X.

Since the lead wire 47 does not come into direct contact with the lubricant in a state of being covered with the cable covers CA1, CA2, and CA3, it is not necessary to dispose the protective tube 48 in this area. On the other hand, the protective tube 48 is disposed so as to cover the lead wire 47 in a portion not covered by the cable covers CA1, CA2, and CA3 in an area equal to or lower than the height H1. This is to ensure that the lead wire 47 does not come into direct contact with the lubricant.

Figure 6:
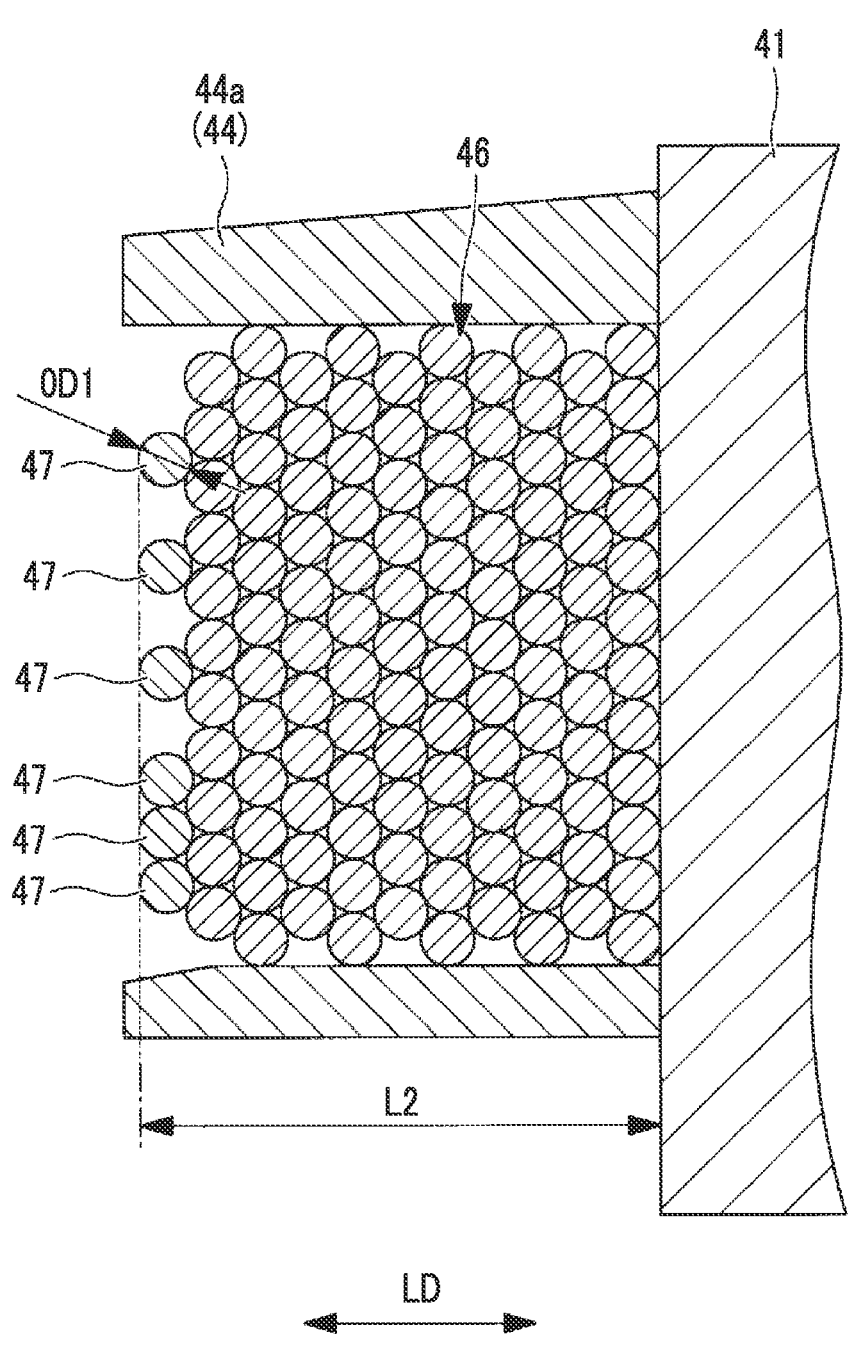
FIG. 6 is a cross-sectional view taken along the line D-D of the electric compressor shown in FIG. 3.

Here, with reference to FIGS. 5 and 6, a reason why the protective tube 48 is disposed only in the protection area PA will be described. FIG. 5 is a cross-sectional view taken along the line C-C of the electric compressor 100 shown in FIG. 3. FIG. 6 is a cross-sectional view taken along the line D-D of the electric compressor 100 shown in FIG. 3.

As shown in FIG. 5, in the protection area PA, the protective tube 48 is disposed at an end portion of the coil portion 46 on the bottom portion 12 side in the direction of the axis X which is supported by the support portion 44a of the bobbin 44. Inside the protective tube 48, the lead wire 47 having an outer diameter OD1 smaller than an inner diameter ID1 of the protective tube 48 is inserted. As shown in FIG. 5, in a longitudinal direction LD parallel to the axis X, a length from an end portion of the stator 41 to an end portion of the protective tube 48 on the bottom portion 12 side is denoted by L1.

On the other hand, as shown in FIG. 6, in an area other than the protection area PA, the protective tube 48 is not disposed at the end portion of the coil portion 46 on the bottom portion 12 side in the direction of the axis X which is supported by the support portion 44a of the bobbin 44. The lead wire 47 having the outer diameter OD1 is disposed at the end portion of the coil portion 46. As shown in FIG. 6, in the longitudinal direction LD parallel to the axis X, a length from the end portion of the stator 41 to an end portion of the lead wire 47 on the bottom portion 12 side is denoted by L2 shorter than L1.

When the protective tube 48 is disposed in an area other than the protection area PA, as shown in FIG. 5, the length from the end portion of the stator 41 to the end portion of the protective tube 48 becomes L1 which is longer than the length L2 of a case where the protective tube 48 is not disposed. In this case, an end portion of the motor 40 on the bottom portion 12 side is closer to the bottom portion 12 side than in a case where the protective tube 48 is not disposed. When the end portion of the motor 40 on the bottom portion 12 side is close to the bottom portion 12 side, there is a possibility that a sufficient insulation distance from another member cannot be maintained.

Therefore, in the present embodiment, by disposing the protective tube 48 only in the protection area PA, it is possible to prevent the insulation distance from the other member from not being sufficiently maintained in an area other than the protection area PA.

The sealing terminal 50 is a member that is installed in the housing 10 and is connected to the lead wire 47. The sealing terminal 50 is attached so as to seal the internal space IS such that the internal space IS of the housing 10 is maintained in a sealed state.

The holding portion 80 is a member that is fixed to the housing 10 and holds the first bearing 60. The holding portion 80 has an end surface on the bottom portion 12 side which comes into contact with a step section 13 of the housing 10, and an end surface on the opening 11 side which comes into contact with the compressor 30. By fixing the end housing 20 to the housing 10, the holding portion 80 is fixed in position in the direction of the axis X in a state of being interposed between the housing 10 and the compressor 30.

The electric compressor 100 of the present embodiment described above has the following operations and advantageous effects.

In the electric compressor 100 according to the present embodiment, the plurality of lead wires 47 connected to one end side of the plurality of coil portions 46 in the direction along the axis X are covered with the covering portion 47b made of a resin, but when immersed in the lubricant stored in the internal space IS of the housing 10, they may be damaged by hydrolysis due to the moisture contained in the lubricant.

Therefore, in the electric compressor 100 according to the present embodiment, only in the protection area PA in a portion of the circumferential direction CD including the area where the lead wire 47 is immersed in the lubricant stored in the internal space IS of the housing 10, the protective tube 48 that protects the lead wire 47 from the moisture contained in the lubricant is disposed so as to surround the entire circumference of the lead wire 47. With the electric compressor 100 according to the present embodiment, the protective tube 48 prevents the lead wire 47 from coming into direct contact with the lubricant. Therefore, it is possible to prevent the covering portion 47b of the lead wire 47 from being damaged by hydrolysis to cause a short circuit.

In addition, with the electric compressor 100 according to the present embodiment, the protective tube 48 is disposed only in the protection area PA in a portion of the circumferential direction CD including an area where the lead wire 47 is immersed in the lubricant stored in the internal space IS of the housing 10 and is not disposed in other areas. Therefore, in the other areas where the protective tube 48 is not disposed, since the protective tube 48 is not disposed so as to surround the lead wire 47, the distance in the direction of the axis X from another member adjacent to the end portion of the coil portion 46 is not shortened. Therefore, an insulation distance between the lead wire 47 and the other member adjacent to the end portion of the coil portion 46 can be appropriately secured.

Further, according to the electric compressor 100 of the present embodiment, since the housing 10 is fixed to the casing 200 in a state in which the axis X is arranged in the horizontal direction, the lubricant contained in the refrigerant is stored in an area on the lower side in the gravity direction. Since the protection area PA in which the protective tube 48 is disposed is an area on the lower side of the housing 10 in the gravity direction, the lead wire 47 is prevented from coming into direct contact with the lubricant in the area on the lower side in the gravity direction in which the lubricant is stored, and it is possible to prevent the covering portion 47b of the lead wire 47 from being damaged due to hydrolysis to cause a short circuit.

In the above description, the lead wire 47 may be protected from the moisture contained in the lubricant by another member instead of the protective tube 48. For example, in the protection area PA, a resin material such as an epoxy resin may be applied and cured on an outer peripheral surface of the lead wire 47 and may be used as a protective member. When it is difficult to selectively apply the resin material only to the outer peripheral surface of the lead wire 47, the resin material may be applied to the entire portion corresponding to the protection area PA of the end portion of the coil portion 46.

In addition, it is considered that the failure that the covering portion 47b made of a resin of the lead wire 47 is damaged by hydrolysis due to the moisture contained in the lubricant to cause a short circuit is likely to occur in a portion where a flow amount of the refrigerant sucked from the outside per hour is larger than that in other areas. Specifically, it is assumed that there is a high possibility that a short circuit occurs due to damage to the covering portion 47*b* in the vicinity of the suction port P1.

Therefore, as in the above-described embodiment, by providing the protective member such as the protective tube 48 only on the bobbin 44 side which is a side close to the suction port P1 in the axis X direction, out of the bobbin 44 and the bobbin 45, there is an effect that the addition of components to prevent a short circuit is minimized. Here, unlike the embodiment described above, in a case where the suction port P1 is provided at a position closer to the bobbin 45 side than to the bobbin 44 side, from such a point of view, the protective member may be provided only on the bobbin 45 side.

In addition, when the suction port P1 is provided at a portion corresponding to an intermediate position between the bobbin 44 and the bobbin 45 in the direction of the axis X, the protective members may be provided on both the bobbin 44 side and the bobbin 45 side. In this case, when the lead wire 47 is not provided on one of the bobbin 44 side and the bobbin 45 side, the protective member such as a resin material may be provided in an area where the end portion of the coil portion 46 needs to be protected.

In addition, in a case where the failure caused by being close to the suction port P1 is more serious than the failure caused by the immersion in the refrigerant described in the above embodiment, the protective member does not necessarily have to be provided in a portion corresponding to the protection area PA and the protective member may be provided in the vicinity of the suction port P1.

In the above-described embodiment, the protective member is provided only at a specific circumferential position. However, it is also possible to provide the protective member over the entire circumference in the circumferential direction and then provide the protective member superimposed intensively on the specific circumferential position. For example, if necessary, the resin material may be intermittently applied over the entire circumference of the end portion of the coil portion 46 in the circumferential direction, and then the protective tube 48 may be provided in a superimposed manner in a portion, which corresponds to the protection area PA in the circumferential direction, of the lead wire 47 connected to the coil portion 46, or in the lead wire 47 of a portion on the suction port P1 side. Further, the protection by the protective tube 48 may be made over the entire circumference, and then the protective tubes 48 may be provided in double or triple in a portion corresponding to the protection area PA in the circumferential direction or in a portion on the suction port P1 side.

The electric compressor described in the present embodiment described above can be understood as follows, for example.

An electric compressor (100) according to the present disclosure includes: a housing (10) formed in a tubular shape extending along an axis (X); a compressor (30) that is disposed inside the housing and rotates around the axis to compress a refrigerant including a lubricant; and a motor (40) that rotationally drives the compressor around the axis, in which the motor includes a stator (41) that is fixed inside the housing and has a plurality of teeth (41*a*) around which coils are wound, a rotor (42) disposed on an inner peripheral side of the stator, a plurality of coil portions (46) formed by winding the coils around the plurality of teeth, a plurality of electrical leads (47) connected to one end side of the plurality of coil portions in a direction along the axis, and a protective member (48) that is disposed to surround an entire circumference of the electrical lead and protects the electrical lead from moisture contained in the lubricant, the electrical lead is covered with a covering portion (47*b*) made of a resin and is disposed along a circumferential direction (CD) around the axis, and the protective member is disposed only in a protection area (PA) in a portion of the circumferential direction including an area where the electrical lead is immersed in the lubricant stored in an internal space of the housing.

In the electric compressor according to the present disclosure, the plurality of electrical leads connected to one end side of the plurality of coil portions in the direction along the axis are covered with the covering portion made of a resin, but when immersed in the lubricant stored in the internal space of the housing, they may be damaged by hydrolysis due to the moisture contained in the lubricant. Therefore, in the electric compressor according to the present disclosure, only in the protection area in a portion of the circumferential direction including the area where the electrical lead is immersed in the lubricant stored in the internal space of the housing, the protective member that protects the electrical lead from the moisture contained in the lubricant is disposed so as to surround the entire circumference of the electrical lead. With the electric compressor according to the present disclosure, the protective member prevents the electrical lead from coming into direct contact with the lubricant. Therefore, it is possible to prevent the covering portion of the electrical lead from being damaged by hydrolysis to cause a short circuit.

In addition, with the electric compressor according to the present disclosure, the protective member is disposed only in the protection area in a portion of the circumferential direction including an area where the electrical lead is immersed in the lubricant stored in the internal space of the housing and is not disposed in other areas. Therefore, in the other areas where the protective member is not disposed, since the protective member is not disposed so as to surround the electrical lead, the distance in the direction of the axis from another member adjacent to the end portion of the coil portion is not shortened. Therefore, an insulation distance between the electrical lead and the other member adjacent to the end portion of the coil portion can be appropriately secured.

The electric compressor according to the present disclosure may have a configuration including a terminal (50) installed in the housing, in which the electrical lead is a lead wire that connects one end side of the plurality of coil portions in a direction along the axis and the terminal.

According to the electric compressor having this configuration, it is possible to prevent the covering portion made of a resin of the lead wire connected to the coil portion from being damaged and to appropriately ensure an insulation distance between the lead wire and another member.

The electric compressor according to the present disclosure may have a configuration in which the housing is fixed to a casing (200) in a state in which the axis (X) is arranged in a horizontal direction, and the protection area where the protective member is disposed is an area on a lower side of the housing in a gravity direction.

According to the electric compressor having this configuration, since the housing is fixed to the casing in a state in which the axis is arranged in the horizontal direction, the lubricant contained in the refrigerant is stored in an area on the lower side in the gravity direction. Since the protection area where the protective member is disposed is an area on the lower side of the housing in the gravity direction, the electrical lead is prevented from coming into direct contact with the lubricant in the area on the lower side in the gravity direction in which the lubricant is stored, and it is possible to prevent the covering portion of the electrical lead from being damaged due to hydrolysis to cause a short circuit.

The electric compressor according to the present disclosure may have a configuration in which the housing is provided with a suction port through which the refrigerant is introduced from an outside, and the protective member is disposed on the electrical lead connected to an end portion on a side close to the suction port out of a pair of end portions of the coil portion in a direction along the axis.

According to the electric compressor having this configuration, the electrical lead connected to the end portion of the coil portion on the side close to the suction port is protected by the protective member. Therefore, in an area which is close to the suction port and in which a flow amount of the refrigerant is larger than that in other areas, it is possible to prevent the covering portion of the electrical lead from being damaged by hydrolysis to cause a short circuit.

The electric compressor according to the above configuration may have a configuration in which the protective member is a tubular member formed of a resin material.

According to the electric compressor having this configuration, it is possible to prevent the covering portion of the electrical lead from being damaged by hydrolysis to cause a short circuit by a relatively simple operation of inserting the electrical lead into the tubular protective member.

The electric compressor according to the above configuration may have a configuration in which the protective member is a resin material that is applied and cured on an outer peripheral surface of the electrical lead.

According to the electric compressor having this configuration, by applying and curing the resin material on the outer peripheral surface of the electrical lead, it is possible to prevent the covering portion of the electrical lead from being damaged by hydrolysis to cause a short circuit.

REFERENCE SIGNS LIST

10: housing
11: opening
12: bottom portion
13: step section
14: leg portion
20: end housing
21: fastening bolt
30: compressor
40: motor
41: stator
41a: teeth
42: rotor
43: drive shaft
44, 45: bobbin
44a: support portion
44b: fixing portion
46: coil portion
47: lead wire
47a: core wire
47b: covering portion
48: protective tube (protective member)
50: sealing terminal
60: first bearing
70: second bearing
80: holding portion
100: electric compressor 200: casing
CA1, CA2, CA3: cable cover
CD: circumferential direction
H1: height
ID1: inner diameter
IS: internal space
LD: longitudinal direction
OD1: outer diameter
P1: suction port
P2: discharge port
PA: protection area
X: axis

The invention claimed is:

1. An electric compressor comprising:
a housing formed in a tubular shape extending along an axis;
a compressor that is disposed inside the housing and rotates around the axis to compress a refrigerant including a lubricant; and
a motor that rotationally drives the compressor around the axis,
wherein the motor includes
a stator that is fixed inside the housing and has a plurality of teeth around which coils are wound,
a rotor disposed on an inner peripheral side of the stator,
a plurality of coil portions formed by winding the coils around the plurality of teeth,
a plurality of electrical leads connected to the plurality of coil portions, and
a protective member formed of a resin material that is disposed to surround an entire circumference of an electrical lead of the plurality of electrical leads and protects the electrical lead from moisture contained in the lubricant,
the electrical lead is covered with a covering portion made of a resin and is disposed along a circumferential direction around the axis, and
the protective member is a tubular member disposed only in a protection area in a portion of the circumferential direction including an area where the electrical lead is immersed in the lubricant stored in an internal space of the housing.

2. The electric compressor according to claim 1, further comprising a terminal installed in the housing,
wherein the electrical lead is a lead wire that connects one end side of the plurality of coil portions in a direction along the axis and the terminal.

3. The electric compressor according to claim 1, wherein the housing is provided with a suction port through which the refrigerant is introduced from an outside, and
the protective member is disposed on the electrical lead connected to an end portion on a side close to the suction port out of a pair of end portions of the coil portion in a direction along the axis.

4. The electric compressor according to claim 1, wherein the housing is fixed to a casing in a state in which the axis is arranged in a horizontal direction, and
the protection area where the protective member is disposed is an area on a lower side of the housing in a gravity direction.

* * * * *